Nov. 28, 1933.  F. C. W. WILKINSON  1,936,815
TUBULAR CONDENSER AND SIMILAR HEAT EXCHANGE APPARATUS
Filed Nov. 18, 1932
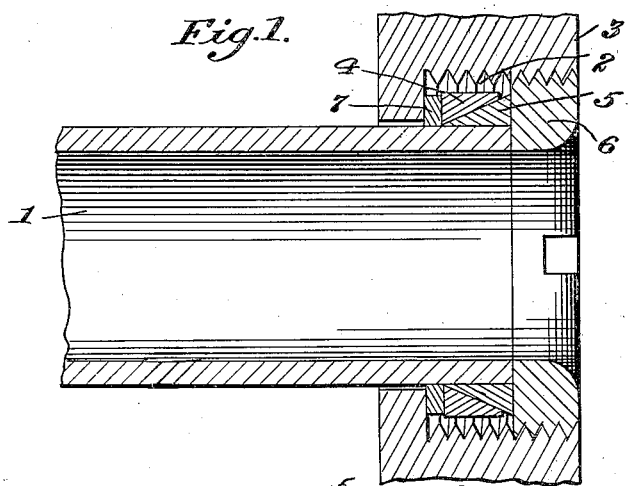
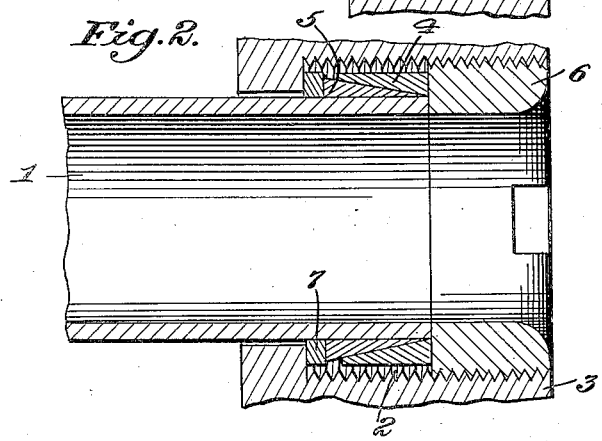
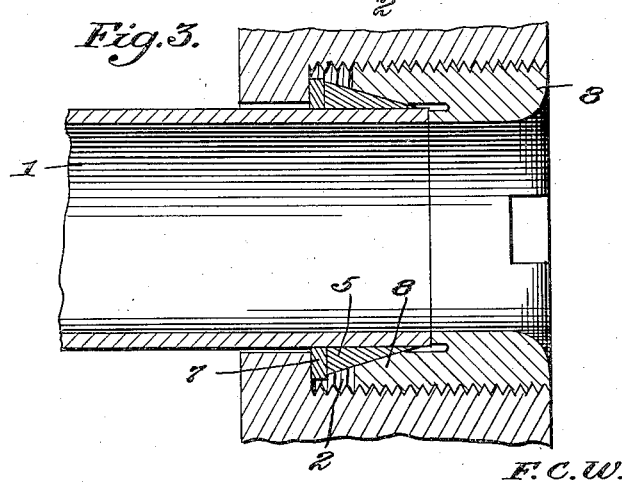
Inventor:
F. C. W. Wilkinson,
by E. F. Wenderoth
Att'y.

Patented Nov. 28, 1933

1,936,815

UNITED STATES PATENT OFFICE 1,936,815

TUBULAR CONDENSER AND SIMILAR HEAT EXCHANGE APPARATUS

Francis Clarence Walter Wilkinson, Burnham, England, assignor of one-half to Crane Packing Company, Chicago, Ill., a corporation of Illinois, and one-half to Crane Packing Limited, Slough, Buckinghamshire, England, a British company Application November 18, 1932, Serial No. 643,281, and in Great Britain December 1, 1931

7 Claims. (Cl. 285—46)

This invention relates to tubular condensers and similar heat exchange apparatus and has for its main object the providing of improved means for fitting the ends of the tubes in their supporting plate or so-called tube sheet.

In accordance with the present invention there are provided in a multitubular heat exchange device in combination a tube sheet having a plurality of shoulder apertures in each of which is removably fitted one end of a heat exchange tube. Threads are provided in each of said apertures and an inner continuous resilient ring having a substantially conical outer surface is mounted upon each of the tube ends located within said apertures. An outer continuous ring having a substantially conical inner surface fitting upon the conical surface of said inner ring is also located within said apertures and a threaded ferrule engages the threads in said apertures so that upon an inward screwing movement of said ferrule, it will force said inner ring and said outer ring into a sliding wedging engagement ever substantially the whole of their conical surfaces and thereby cause the inner ring to exert over substantially the whole of its axial width an elastic radial band-like grip upon the tube end.

The inner of the two rings is such that in virtue of its texture, dimensions and/or the material of which it is made, it is resiliently elastic. Desirably, however, both rings are made of the same metal as that of which the tubes themselves are made.

Figures 1, 2 and 3 of the accompanying drawing illustrate in partial cross section three different embodiments of the invention which will now be described more fully.

The condenser tube is indicated at 1 and it has its end located in a recess 2 in a tube sheet 3. The recess 2 is appreciably greater in diameter than the tube 1 and in the annular space are placed two interfitting rings having conical contacting surfaces so that when they are forced to move axially with respect to one another, they tend to extend radially inwardly and outwardly in the recess.

In the construction shown in Figure 1 the reference numeral 4 indicates the outer ring and 5 is the inner ring. A ferrule or ring 6 is screw-threaded so as to engage the screw threads provided in the recess 2 and thereby apply pressure to the rings 4 and 5. Said ferrule has an inner diameter the same as the inner diameter of the end of the condenser tube and is flared outwardly. Thus when it is screwed in against the end of said tube, it not only provides a positive stop for the latter to prevent outward movement thereof but it also provides for a smooth flow of fluid into the tube.

The rings 4, 5, and 6 are preferably made of the same material as the tube 1 in order to prevent as far as possible, electrolysis taking place at the junction of a plurality of different metals. In the case of steam surface condensers the older forms of tubes have been made usually of various compositions of copper, zinc and tin, known to the trade as Muntz metal, Admiralty metal and other designations, and more recently of a composition of copper and nickel. The requisite resiliency necessary in the ring 5 can be obtained by proper annealing or tempering. An end washer 7 or sealing member is constructed of a suitable metal, preferably soft metal or of fiber or both.

The embodiment shown in Fig. 2 is similar to that shown in Figure 1 with the exception that the inner ring 5 has its taper pointing towards the mouth of the tube.

In the embodiment shown in Figure 3 the outer one of the two interfitting rings and the pressure applying ring or ferrule are constituted as one piece 8. The operation of the parts is substantially the same as the operation of the parts in Figure 2.

There are numerous advantages inherent in the tube fitting above described which will be apparent to those skilled in the art. The arrangement provides a tight joint and a positive anchorage of the tube ends in the tube sheet without deforming the tube and without requiring any treatment of the tube such as the flaring of its ends. No perishable packing material is required and no special tools for fitting the parts together are necessary. The tube cannot creep or turn and its remote end may be packed in the remote tube sheet in such a way as to be free to move axially to permit of expansion and contraction, both ends providing an air tight joint so as to maintain a high vacuum if necessary, as in the case of a steam surface condenser.

Upon the screwing up of the ferrule the conical surfaces will come into action over substantially the entire length of their conical surfaces and thereby cause the inner ring to contract and exert over substantially the whole of its axial width an elastic radial band-like grip upon the tube end. If prior to screwing up said ferrule, said tube end projects into the aperture farther than is shown in the drawing, i. e., more to the right, said ferrule will engage the end of said tube, which is cut off squarely, and will push it inwardly at the same time that it is causing the said inner ring to grip the outer surface of said tube. This bodily movement of the tube to the left is not prevented at the other end of said tube as the latter slides through the packing which surrounds said end, and if said end has not yet been packed, it slides freely in the opening in the tube sheet. It will be noted that no permanent deformation takes place since the inner resilient ring is caused to exert an axial elastic grip upon the tube end and at all times the inner ring and, in the forms shown in Figures 1 and 2, the outer ring as well, are fully clear of the threads provided in the recess. It has been found that with the present invention a construction is provided which allows easy replacement of any tube at any time. Even after a tube has been fitted to the tube sheet for several months, upon loosening and unscrewing the ferrule, the inner ring, which has been under compression will, due to its elasticity, tend to expand slightly, i. e. return to its initial dimensions and thus release its grip on the tube 1, permitting the same to be withdrawn readily at any time, without damaging any part of the device, and at a minimum expense. In the case of a steam surface condenser embodying several thousand tubes, many of which require renewal after certain intervals of time, this feature will be seen to be very important.

The tube, the inner ring, the outer ring and the ferrule are in practically every case capable of re-use without alteration of any sort. Said rings and ferrule may be applied to both ends of the tube if desired.

It is obvious that the constructions set forth above are merely the preferred constructions and that the invention can be embodied in other analogous devices and it is the intention to claim all such devices as will fall within the spirit of the following claims.

What I claim is:—

1. In a multitubular heat exchange device, in combination, a tube sheet having a plurality of shouldered apertures in each of which is removably fitted one end of a heat exchange tube, threads formed in each of said apertures, an inner continuous resiliently deformable ring having a substantially conical outer surface and mounted on each of said tube ends within said apertures, an outer continuous ring having a substantially conical inner surface fitting upon the conical surface of said inner ring, and a threaded ferrule engaging said threads so as upon inward screwing movement therein to force said inner ring and said outer ring into sliding wedging engagement over substantially the whole of their conical surfaces and cause the inner ring to exert over substantially the whole of its axial width an elastic radial band-like grip upon the tube end, said ferrule abutting against the end of said tube and having an inner diameter the same as the inner diameter of said tube, to provide for a smooth flow of fluid therethrough.

2. In a multitubular heat exchange device, in combination, a tube sheet having a plurality of shouldered apertures in each of which is removably fitted one end of a heat exchange tube, a sealing member in each aperture against the shoulder thereof and surrounding the tube therein, threads formed in each of said apertures, an inner continuous resiliently deformable ring having a substantially conical outer surface and mounted on each of said tube ends within said apertures, a threaded ferrule engaging said threads and having an axial extension forming a continuous ring having an inner substantially conical surface and adapted upon inward screwing movement of the ferrule within the aperture to fit upon said inner ring in sliding wedging engagement therewith over substantially the whole of its conical surface, and cause the ring to exert over substantially the whole of its axial width an elastic radial band-like grip upon the tube end.

3. In a multitubular heat exchange device, in combination, a tube sheet at each end, openings in one of said tube sheets, heat exchange tubes each having one end free to move axially in said openings, the other tube sheet having a plurality of shouldered apertures in which are removably fitted the other ends of said tubes, threads formed in each of said apertures, an inner continuous resiliently deformable ring having a substantially conical outer surface and mounted on each of said tube ends within said apertures, an outer continuous ring relatively harder than the inner ring and having a substantially conical inner surface fitting upon the conical surface of said inner ring, and a threaded ferrule engaging said threads and having an inner diameter the same as that of the adjacent tube end, so as upon inward screwing movement therein to engage said adjacent tube end and tend to force it inwardly and simultaneously to force said inner ring and said outer ring into sliding wedging engagement over substantially the whole of their conical surfaces and cause the inner ring to exert over substantially the whole of its axial width an elastic radial band-like grip upon said tube end.

4. In a multitubular heat exchange device, in combination, a tube sheet having a shouldered aperture therein in which one end of a heat exchange tube is positioned loosely, a sealing ring around said tube end and against said shoulder, threads formed in said aperture, a ring of resilient material surrounding said tube end located within said aperture and means co-operating with said threads for compressing said sealing ring and deforming said resilient ring so as to clasp said tube end in an elastic grip, said means engaging the end of said tube and having an opening therethrough of the same diameter as the opening in said tube and having a flaring outer end.

5. A heat exchange device comprising a tube sheet having an aperture therein in which one end of a heat exchange tube is located, a resilient ring surrounding said tube end and located within said aperture, a conical outer surface upon said ring and means co-operating with said conical outer surface and said tube sheet to deform said ring in order to clasp the tube end in an elastic grip, said means engaging the end of said tube and having an opening therethrough of the same diameter as the opening in said tube and having a flaring outer end.

6. A steam surface condenser having a tube sheet with shouldered screw threaded apertures therein, tubes arranged each with one end received in one of said apertures, a pair of complementary cone shaped metal rings surrounding each tube end, the inner of said rings having normally a sliding fit over the tube end and, a screw threaded ferrule in said screw threaded aperture and of a thickness sufficient to cause it to engage the end of said tube and to force the outer ring over the inner ring and thereby contracting the latter to cause it to grip said tube end firmly, said inner ring being made of flexible metal whereby when said ferrule is unscrewed and the pressure of said outer ring is relieved, said inner ring will relax its grip on said tube and permit withdrawal thereof.

7. A steam surface condenser having a tube sheet with shouldered screw threaded apertures therein, tubes made of a composition of metals having good heat conducting properties and arranged each with one end received in one of said apertures, a pair of complementary cone shaped rings surrounding each tube end, the inner of said rings having normally a sliding fit over the tube end and a screw threaded ferrule in said screw threaded aperture for forcing the outer ring over the inner ring and thereby contracting the latter to cause it to grip said tube end firmly, said rings and ferrule being made of the same material as said tubes, to reduce electrolytic action, said inner ring being flexible whereby when said ferrule is unscrewed and the pressure of said outer ring is relieved, said inner ring will relax its grip on said tube and permit withdrawal thereof and also permit reuse of said rings.

FRANCIS CLARENCE WALTER WILKINSON.